United States Patent
Minemura (10) Patent No.: US 8,401,587 B2
(45) Date of Patent: Mar. 19, 2013

(54) REMOTE POWER CONTROL SYSTEM AND POWER SUPPLY TAP

(75) Inventor: Takashi Minemura, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/449,169

(22) Filed: Apr. 17, 2012

(65) Prior Publication Data

US 2012/0200398 A1      Aug. 9, 2012

Related U.S. Application Data

(63) Continuation of application No. 12/249,768, filed on Oct. 10, 2008, now abandoned.

(30) Foreign Application Priority Data

Oct. 31, 2007   (JP) ................................. 2007-283847

(51) Int. Cl.
    *H04B 7/00* (2006.01)
(52) U.S. Cl. ..... 455/522; 455/419; 455/420; 455/67.11; 455/352; 455/127.1; 340/539.14; 340/539.3; 340/425.2
(58) Field of Classification Search .................. 455/522, 455/404.1, 412.2, 414.1, 419, 420, 423, 9, 455/41.1, 41.2, 67.11, 68, 343.6, 352; 340/825.69, 340/825.71, 825.72, 310.08, 656, 870.11, 340/635, 310.01, 538, 310, 660; 307/104, 307/34, 41, 131, 126, 115, 35, 38, 39
    See application file for complete search history.

(56) References Cited

U.S. PATENT DOCUMENTS

| | | |
|---|---|---|
| 5,097,249 A | 3/1992 | Yamamoto |
| 5,811,966 A | 9/1998 | Lee |
| 5,815,297 A | 9/1998 | Ciciora |
| 5,943,228 A | 8/1999 | Kim |
| 5,990,581 A | 11/1999 | Ikegami et al. |
| 5,991,278 A | 11/1999 | Betts |
| 6,163,507 A | 12/2000 | Gholson |
| 6,483,291 B1 | 11/2002 | Bhateja et al. |
| 6,940,272 B2 | 9/2005 | Niv |
| 7,274,303 B2 | 9/2007 | Dresti et al. |
| 7,705,484 B2 | 4/2010 | Horst |
| 7,830,041 B2 | 11/2010 | Yang et al. |
| 2002/0158763 A1 | 10/2002 | Takarada et al. |

(Continued)

FOREIGN PATENT DOCUMENTS

| | | |
|---|---|---|
| JP | H9-115623 A | 5/1997 |
| JP | 10-282161 | 10/1998 |

(Continued)

OTHER PUBLICATIONS

An English translation of Notice of Reasons for Rejection issued by the Japan Patent Office on Jan. 6, 2009.

*Primary Examiner* — Sujatha Sharma
(74) *Attorney, Agent, or Firm* — Knobbe, Martens, Olson and Bear, LLP (57) ABSTRACT

According to one embodiment, a power supply tap includes a first wireless reception module which receives a control request which is transmitted from a remote-control terminal by a first wireless signal, a power observation module which is activated in a case where the received control request includes a power information acquisition request, and observes a total amount of power including power supplied to an electric apparatus from a power output module and power consumed by a communication control module, a first wireless transmission module which transmits the observed total amount of power to the remote-control terminal by a second wireless signal, and a switch control module which turns off a switch in a case where the control request received by the first wireless reception module includes a power-off request, thereby shutting off power supply to the electric apparatus from the power output module.

12 Claims, 5 Drawing Sheets

U.S. PATENT DOCUMENTS

2006/0036380 A1    2/2006    Lee et al.
2007/0159348 A1    7/2007    Kang et al.

FOREIGN PATENT DOCUMENTS

| | | |
|---|---|---|
| JP | 411316623 A | 11/1999 |
| JP | 3067768 U | 1/2000 |
| JP | 2000-261864 | 9/2000 |
| JP | 2003-508002 | 2/2003 |
| JP | 2003-88004 A | 3/2003 |
| JP | 2004-152740 | 5/2004 |
| JP | 2004-336896 | 11/2004 |
| JP | 2006-114997 | 4/2006 |
| JP | 2006-148450 A | 6/2006 |
| JP | 2006-162371 | 6/2006 |

REMOTE POWER CONTROL SYSTEM AND POWER SUPPLY TAP

CROSS-REFERENCE TO RELATED APPLICATIONS

This application is a continuation of U.S. patent application Ser. No. 12/249,768, filed on Oct. 10, 2008 and entitled "REMOTE POWER CONTROL SYSTEM AND POWER SUPPLY TAP," which is based upon and claims the benefit of priority from Japanese Patent Application No. 2007-283847, filed Oct. 31, 2007, the entire contents of each of which are incorporated herein by reference.

BACKGROUND

1. Field

One embodiment of the invention relates to a remote power control system for remote-controlling, by a wireless signal, power that is supplied to an electric apparatus, and a power supply tap which is used in the remote power control system.

2. Description of the Related Art

In general, various electric apparatuses, such as televisions and audio/video recorders, are used in homes. Even while these electric apparatuses are in the power-off state, the electric apparatuses consume power (standby power) in the standby state in which the electric apparatuses stand by, for example, for the reception of a signal which is sent from a remote-control module. Thus, in order to reduce to zero the power including standby power, which is consumed by the electric apparatuses, it is necessary to disconnect power cables of the electric apparatuses from plug sockets.

In usual cases, however, the plug sockets are disposed at corners of rooms, and there are cases in which the plug sockets are disposed at places which are hidden by electric equipment or furniture. Thus, actually, it is not always easy for users to frequently pull out power cables of electric apparatuses from plug sockets.

Jpn. Pat. Appln. KOKAI Publication No. H10-282161 discloses a power consumption monitor system which monitors the power that is consumed by electric apparatuses.

This power consumption monitor system monitors the power that is consumed by electric apparatuses so that the power consumed by the electric apparatuses may not exceed a tolerable power amount. In this power consumption monitor system, the power that is consumed by the electric apparatuses is measured by a power meter which is provided in a plug socket adapter which functions as a power supply tap. The amount of power measured by the power meter is transmitted to a plug socket monitor by a wireless communication module which is provided in the plug socket adapter, and the measured power amount is displayed on a display device of the plug socket monitor. If the power consumed by the electric apparatuses exceeds a predetermined value, the plug socket monitor informs the user of this fact, or reports it to a center.

However, this power consumption monitor system, as described above, is the system for monitoring the power that is consumed by electric apparatuses so that the power consumed by the electric apparatuses may not exceed a tolerable power amount. No consideration is given to a scheme for power saving, which reduces, e.g. standby power that is supplied to the electric apparatuses.

In the above-described power consumption monitor system, the power meter provided in the plug socket adapter is always in operation for monitoring power. Consequently, the plug socket adapter consumes a relatively large power at all times, for example, owing to the operation of the power meter itself.

In order to achieve power saving, it is important not only to reduce as much as possible the power consumed by the electric apparatuses and the standby power thereof, but also to reduce the power consumed by the power supply tap such as the plug socket adapter.

Besides, in the above-described power consumption monitor system, the power that is measured by the power meter is only the power consumed when the electric apparatuses operate, and the amount of power that is consumed by communication control circuits (a current meter, a wireless transmission module), which are provided in the plug socket adapter, is not measured. Thus, in this power consumption monitor system, the user cannot exactly understand the amount of power that is actually consumed. In order to make the user conscious of power saving, it is necessary to inform the user of the exact amount of power that is actually consumed.

It is necessary, therefore, to realize a novel function which can sufficiently support the operation relating to power saving by the user, with low power consumption and a simple operation.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a remote power control system including a power supply tap and a remote-control terminal which remote-controls the power supply tap by a wireless signal, the power supply tap comprises a power input module configure to be inputted power, a power output module configure to output the input power to an electric apparatus, a switch disposed between the power input module and the power output module, and a communication control module configure to execute wireless communication with the remote-control terminal, the communication control module including a first wireless reception module which receives a control request which is transmitted from the remote-control terminal by a first wireless signal, a power observation module configure to be activated in a case where the control request received by the first wireless reception module includes a power information acquisition request, and to observe a total amount of power consumed via the power supply tap, the total amount of power including power supplied to the electric apparatus from the power output module and power consumed by the communication control module, a first wireless transmission module configure to transmit the total amount of power, which is observed by the power observation module, to the remote-control terminal by a second wireless signal, and a switch control module configure to turn off the switch in a case where the control request received by the first wireless reception module includes a power-off request, thereby shutting off power supply to the electric apparatus from the power output module, and the remote-control terminal comprises an input module, a second wireless transmission module configure to transmit the control request, which includes one of the power information acquisition request and the power-off request, to the power supply tap by the first wireless signal in response to an operation of the input module, a second wireless reception module configure to receive the observed total amount of power which is transmitted from the power supply tap by the second wireless signal, and a display module configure to display information relating to the power consumed via the power supply tap, on the basis of the total amount of power which is received by the second wireless reception module.

Figure 1:
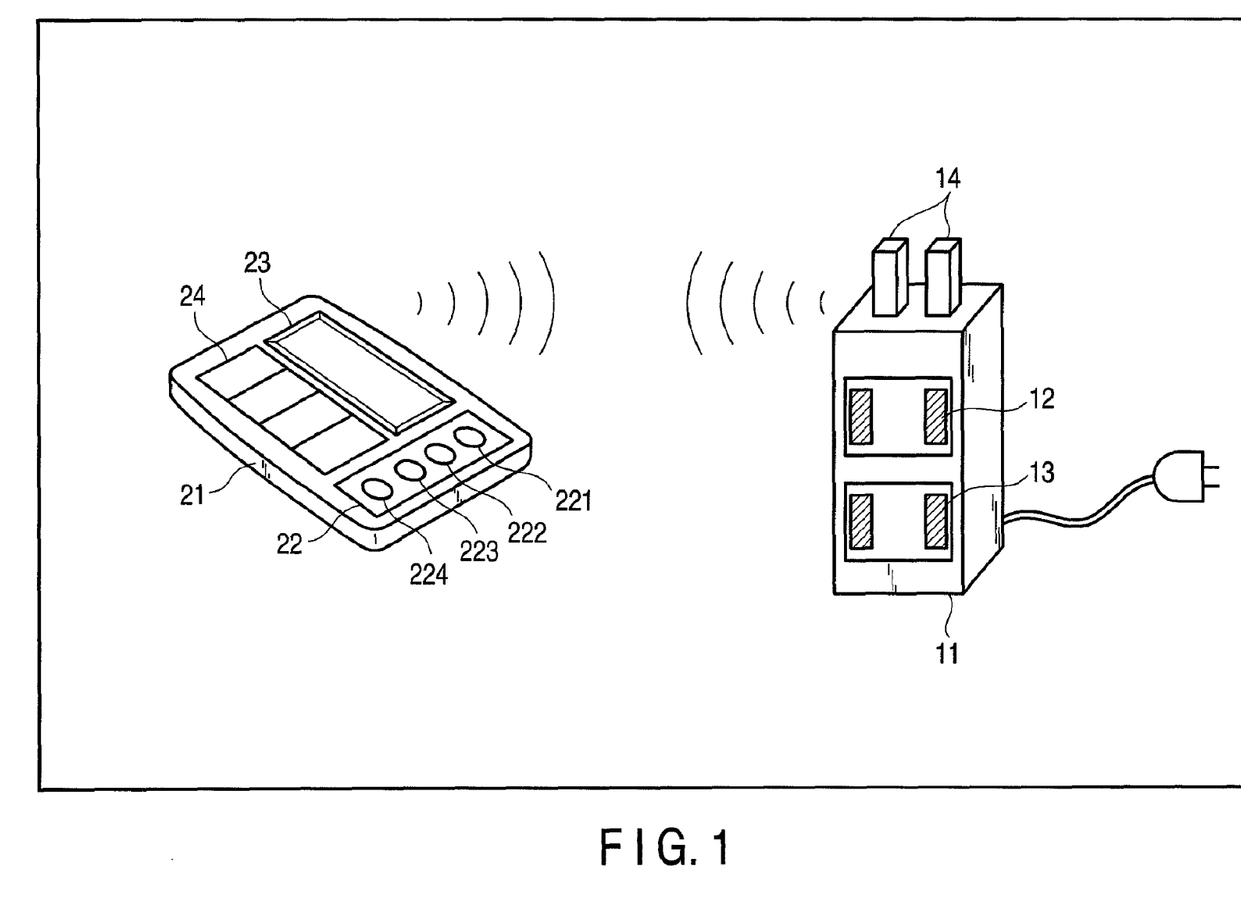
FIG. 1 is an exemplary block diagram showing the configuration of a remote power control system according to an embodiment of the present invention.

To begin with, with reference to FIG. 1, the configuration of a remote power control system according to an embodiment of the present invention is described.

This remote power control system is a system for remote-controlling the power, which is supplied to an electric apparatus, by a wireless signal (radio wave). The remote power control system comprises a power supply tap 11 and a remote-control terminal 21 which remote-controls the power supply tap 11 by a wireless signal. The remote-control terminal 21 is, for instance, a handheld remote controller.

The power supply tap 11 is a so-called power supply outlet which supplies power, such as commercial power from a plug socket, to one or more electric apparatuses. The power supply tap 11 includes a power input module to which power from the plug socket is input, and at least one power output module which outputs the power, which is input from the power input module, to at least one electric apparatus. FIG. 1 shows, by way of example, a case in which the power supply tap 11 is provided with two power output modules 12 and 13. Each of the two power output modules 12 and 13 is composed of, for instance, a receptacle.

The power supply tap 11 has a zero-standby-power function. The zero-standby-power function is realized by a communication control module which is provided in the power supply tap 11. The communication control module is configured to execute wireless communication with the remote-control terminal 21 via an antenna 14 which is provided on the power supply tap 11. The antenna 14 may be built in the casing of the power supply tap 11.

The communication control module has a power report function. In the power report function, in response to a control request including a power information acquisition request, which is sent from the remote-control terminal 21, the communication control module observes the amount of power that is consumed via the power supply tap 11, and sends the observed power consumption amount to the remote-control terminal 21.

The process of observing the amount of power is not executed at all times, but is executed only when the control request from the remote-control terminal 21 is received.

Specifically, the communication control module includes a power observation module such as a current meter. The power observation module is activated only when the control request from the remote-control terminal 21 is received by the communication control module, and executes power observation. Thereby, compared to the structure in which the observation of power amount is always executed, the power consumption of the communication control module can greatly be reduced.

In the process of observing the amount of power, the power observation module observes not only the power (the power consumed by the electric apparatus and the standby power of the electric apparatus) which is supplied from the power supply tap 11 to the electric apparatus that is connected to the power supply tap 11 via, e.g. a power cable, but also the power consumed by the communication control module. The power observation module measures the total amount of power consumed by the power supply tap 11, which includes the power supplied to the electric apparatus via the power supply tap 11 and the power consumed by the communication control module. Therefore, the amount of power consumed by the power supply tap 11 can exactly be reported to the remote-control terminal 21, with the amount of power consumed by the communication control module being taken into account.

The zero-standby-power function also includes a power-off function for shutting off power which is supplied from the power output module 12, 13 to the electric apparatus connected to the power output module 12, 13, in response to a control request including a power-off request which is sent from the remote-control terminal 21 by a wireless signal. This power-off function can individually shut off power output from each of the power output modules 12 and 13, and can shut off, at the same time, power output from the power output modules 12 and 13. The power-off function realizes the same power supply control as in the case of pulling the power cable of the electric apparatus from the plug socket, by remote-control from the remote-control terminal 21. By this power-off function, the user can easily reduce to zero the power (standby power), which is consumed by the electric apparatus at the standby time of the electric apparatus, simply by operating the remote-control terminal 21, without performing the operation of pulling the power cable of the electric apparatus from the plug socket.

By the above-described zero-standby-power function, the operation relating to the power saving by the user can sufficiently be supported with small power consumption and a simple operation.

Further, when the power-off function is executed, the power observation module observes, as information indicative of the power saving effect by the power-off, the value of either the variation of the total power amount before and after the power-off or the total power amount after the power-off. The communication control module transmits the value, which is observed by the power observation module, to the remote-control terminal 21 by a wireless signal as the information indicative of the power saving effect by the power-off.

In this manner, at the time of the power-off, the information indicative of the power saving effect by the power-off is sent to the remote-control terminal 21, and thereby the user can easily confirm the effect by the power-off. Hence, the user can be made more conscious of energy saving.

The remote-control terminal 21 is a remote controller which remote-controls the power supply tap 11. The remote-control terminal 21 has, for example, a thin card-shaped main body. An input module 22, a display module 23 and a lightreceiving module (solar panel) of a solar cell module 24 are disposed, for example, on a top surface of the main body.

The input module 22 is an input device for a user operation, and includes a plurality of operation buttons 221, 222, 223 and 224.

The operation button 221 is, for instance, an operation button for inquiring of the power supply tap 11 about the present amount of power consumed via the power supply tap 11. In the case where the operation button 221 is pressed by the user, the remote-control terminal 21 transmits a control request including a power information acquisition request to the power supply tap 11.

The operation button 222 is an operation button for turning on/off the power supply from the power output module 12 to the electric apparatus which is connected to the power output module 12 via, e.g. the power cable. In the case where the operation button 222 is pressed by the user, the remote-control terminal 21 transmits to the power supply tap 11 a control request including a power-on request or a power-off request to the power output module 12.

The operation button 223 is an operation button for turning on/off the power supply from the power output module 13 to the electric apparatus which is connected to the power output module 13 via, e.g. the power cable. In the case where the operation button 223 is pressed by the user, the remote-control terminal 21 transmits to the power supply tap 11 a control request including a power-on request or a power-off request to the power output module 13.

The operation button 224 is an operation button for turning on/off the power supply from all power output modules 12 and 13 at the same time. In the case where the operation button 224 is pressed by the user, the remote-control terminal 21 transmits to the power supply tap 11 a control request including a power-on request or a power-off request to each of the power output modules 12 and 13.

The display module 23 displays the information relating to the power amount, on the basis of the power amount sent from the power supply tap 11. For example, the display module 23 may display the power amount itself which is sent from the power supply tap 11, or may display an electricity charge corresponding to the power amount which is sent from the power supply tap 11. In this way, with the provision of the display module 23 on the remote-control terminal 21, the user can easily confirm, at hand, the present amount of power consumed via the power supply tap 11, and the power-saving effect at the time of power-off.

The solar cell module 24 is a power supply module which supplies power to each module in the remote-control terminal 21. The solar cell module 24 can perform photoelectric conversion and store electricity. Accordingly, the user can frequently perform, without paying attention to the power consumption of the remote-control terminal 21, the operation for confirming the amount of power consumed via the power supply tap 11, and the operation for turning on/off the power supply tap 11.

As described above, the communication between the remote-control terminal 21 and the power supply tap 11 is executed by using not infrared, but a wireless signal (radio wave). Therefore, the power supply tap 11 can be remote-controlled from the remote-control terminal 21 even in the case where an obstacle, such as electric equipment or furniture, is present between the remote-control terminal 21 and the power supply tap 11.

Figure 2:
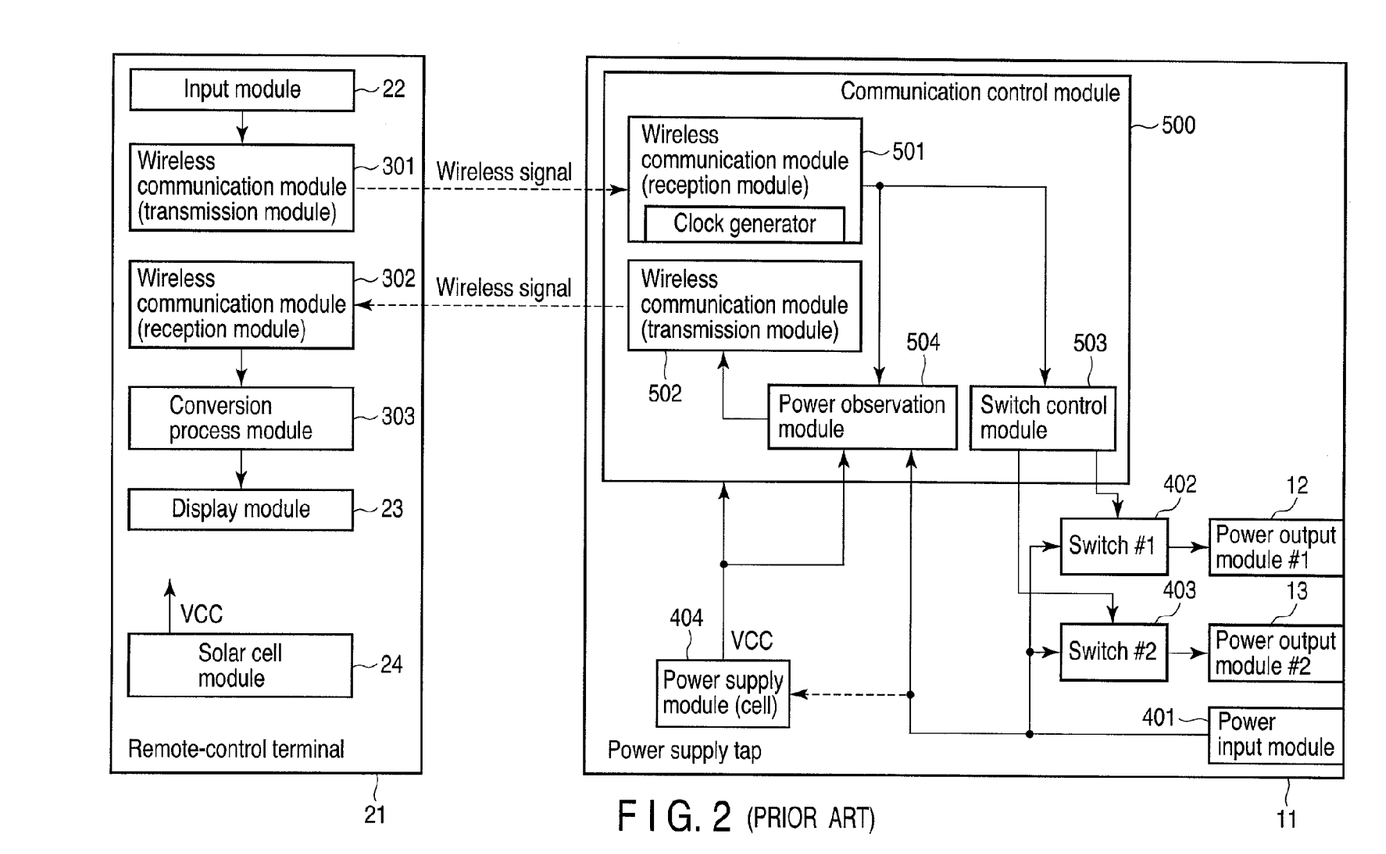
FIG. 2 is an exemplary block diagram showing the system configurations of a power supply tap and a remote-control terminal, which constitute the remote power control system according to the embodiment.

Next, referring to FIG. 2, structure examples of the power supply tap 11 and remote-control terminal 21 are described.

The power supply tap 11 includes, in addition to the above-described power output modules 12 and 13, a power input module 401, switches 402 and 403, a power supply module 404 and a communication control module 500.

The power input module 401 is an input module which receives power that is output from the plug socket which outputs commercial power. The power input module 401 is connected to the plug socket via a power cable, or is directly connected to the plug socket.

The switch 402 is a first switch circuit which is disposed between the power input module 401 and the power output module (first power output module) 12, and connects or disconnects the power input module 401 and the power output module (first power output module) 12. The switch 402 is used in order to turn on/off the supply of power from the power output module (first power output module) 12 to the electric apparatus.

The switch 403 is a second switch circuit which is disposed between the power input module 401 and the power output module (second power output module) 13, and connects or disconnects the power input module 401 and the power output module (second power output module) 13. The switch 403 is used in order to turn on/off the supply of power from the power output module (second power output module) 13 to the electric apparatus.

The power supply module 404 generates power for driving the communication control module 500. The power supply module 404 is composed of a cell, such as a button cell or a dry cell, which supplies power to the communication control module 500. Thereby, power for driving the communication control module 500 can be generated without providing a circuit with a relatively low power conversion efficiency, such as an AC/DC converter, within the power supply tap 11. Therefore, the power consumption of the power supply tap 11 can be reduced. Needless to say, the power supply module 404 may be configured to generate, from the power (AC power) that is input from the power input module 401, DC power for driving the communication control module 500.

The communication control module 500 includes a wireless communication module (first wireless reception module) 501, a wireless communication module (first wireless transmission module) 502, a switch control module 503 and a power observation module 504.

The wireless communication module (first wireless reception module) 501 receives a control request which is sent from the remote-control terminal 21 by a first wireless signal. The wireless communication module (first wireless reception module) 501 includes a clock generator which generates a clock signal having a lower frequency than a carrier wave frequency of the first wireless signal. The carrier wave frequency of the first wireless signal is, for example, on the order of several MHz to several GHz, and the frequency of the clock signal of the clock generator is, for example, on the order of several KHz. The wireless communication module (first wireless reception module) 501 does not use the carrier wave frequency of the first wireless signal in order to demodulate the received first wireless signal, but uses the clock signal, which is generated from the clock generator, thereby executing the demodulation of the received first wireless signal. In this manner, by executing the demodulation process in sync with the low-frequency clock signal, the power consumed by each transistor in the wireless communication module (first wireless reception module) 501 can be reduced. Specifically, since the communication speed (communication rate) of the wireless communication, which is executed between the remote-control terminal 21 and the wireless communication module (first wireless reception module) 501 by using the first wireless signal, is set at a low speed (low rate), the digital data string, which constitutes the control request, can correctly be demodulated even in the case of using the internal clock signal that is generated from the internal clock generator as the sync signal for the demodulation process, without generating a signal which is in sync with the carrier wave frequency of the first wireless signal. In other words, it should suffice if the communication speed (communication rate) of the wireless communication, which is executed between the remote-control terminal 21 and the wireless communication module (first wireless reception module) 501 by using the first wireless signal, is limited to the range of, e.g. several 100 bps to several kbps, which is not higher than the communication rate with which the demodulation can be executed by the internal clock signal that is generated from the internal clock generator.

Normally, there is a relationship of a trade-off between the reception sensitivity at the standby time of the wireless reception module and the power consumption at the standby time of the wireless reception module. In the present embodiment, since the communication speed of wireless communication, which is executed between the remote-control terminal 21 and the wireless communication module (first wireless reception module) 501 by using the first wireless signal, is low, even if the reception sensitivity of the wireless communication module (first wireless reception module) 501 is somewhat low, the control request that is sent from the remote-control terminal 21 can be received and demodulated.

The power observation module 504 is activated in the case where the control request received by the wireless communication module (first wireless reception module) 501 includes the power information acquisition request, and the power observation module 504 observes the total amount of power consumed via the power supply tap 11, which includes the power supplied to the electric apparatus from the power output module 12, 13 and the power consumed by the communication control module 500. In short, the total amount of power, which is observed by the power observation module 504, is the sum of the power supplied to the electric apparatus from the power output module 12, 13 and the power consumed by the communication control module 500.

Specifically, the power observation module 504 executes a process of measuring a first current flowing from the power input module 401 to the power output module 12, 13, and a process of measuring a second current flowing from the power supply module 404 to the communication control module 500, and calculates the total amount of power from the measurement result of the first current and the measurement result of the second current.

The wireless communication module (first wireless transmission module) 502 sends, as a response to the power information acquisition request, the value that is observed by the power observation module 504 to the remote-control terminal 21 by a second wireless signal (radio wave). The wireless communication module (first wireless transmission module) 502 is activated only after the control request is received by the wireless communication module (first wireless reception module) 501.

Accordingly, the communication speed of wireless communication, which is executed between the wireless communication module (first wireless transmission module) 502 and the remote-control terminal 21 by using the second wireless signal, does not need to be set at a low rate, and may be set to be higher than the communication speed of wireless communication, which is executed between the wireless communication module (first wireless reception module) 501 and the remote-control terminal 21 by using the first wireless signal. In other words, in the present embodiment, the communication speed of wireless communication, which is executed between the wireless communication module (first wireless reception module) 501 and the remote-control terminal 21 by using the first wireless signal, is lower than the communication speed of wireless communication, which is executed between the wireless communication module (first wireless transmission module) 502 and the remote-control terminal 21 by using the second wireless signal. With this structure, the delay amount of the response to the control request can be minimized, while the power consumed at the standby time for the control request from the remote-control terminal 21 can be reduced.

In the case where the control request that is received by the wireless communication module (first wireless reception module) 501 includes the power-off request, the switch control module 503 turns off one of the switches 402 and 403, or both switches 402 and 403, thereby shutting off the power supply from one of the power output modules 12 and 13 to the electric apparatus which is connected to this one of the power output modules 12 and 13, or the power supply from both the power output modules 12 and 13 to the electric apparatuses which are connected to the power output modules 12 and 13. The power-off request includes identification information (ID) which designates the power output module that is to be powered off. For example, ID=1 designates the power output module 12, ID=2 designates the power output module 13, and ID=ALL designates all power output modules provided in the power supply tap 11 (the two power output modules 12 and 13 in this embodiment). The switch control module 503 determines the switch that is to be turned off, in accordance with the identification information (ID) that is included in the power-off request.

In addition, in the case where the control request that is received by the wireless communication module (first wireless reception module) 501 includes the power-on request, the switch control module 503 executes a process of turning on one of the switches 402 and 403, or both the switches 402 and 403. In this power-on process, too, the switch control module 503 can determine the switch that is to be turned on, in accordance with the identification information (ID) included in the power-on request.

The remote-control terminal 21 includes a wireless communication module (second wireless transmission module) 301, a wireless communication module (second wireless reception module) 302 and a conversion process module 303, in addition to the above-described input module 22, display module 23 and solar cell module 24 which are shown in FIG. 1.

The wireless communication module (second wireless transmission module) 301 transmits to the power supply tap 11, by the first wireless signal, the control request including the above-described power information acquisition request, power-off request or power-on request, in accordance with the user's operation of the various operation buttons in the input module 22. The wireless communication for transmitting the control request from the wireless communication module (second wireless transmission module) 301 to the wireless communication module (first wireless reception module) 501 in the power supply tap 11 is executed at a low rate, as described above.

The wireless communication module (second wireless reception module) 302 executes the wireless communication with the wireless transmission module (first wireless transmission module) 502 in the power supply tap 11, and receives the power information (observed power value, etc.) which is sent from the wireless transmission module (first wireless transmission module) 502 by the second wireless signal. The wireless communication for transmitting the power information from the wireless transmission module (first wireless transmission module) 502 to the wireless communication module (second wireless reception module) 302 is executed, as described above, at a higher rate than the wireless communication for transmitting the control request from the wireless communication module (second wireless transmission module) 301 to the wireless communication module (first wireless reception module) 501 in the power supply tap 11.

For example, the wireless transmission for transmitting the control request from the wireless communication module (second wireless transmission module) 301 to the wireless communication module (first wireless reception module) 501 may be realized by using a one-way wireless communication method with a low communication rate.

Besides, the wireless communication for transmitting the power information from the wireless transmission module (first wireless transmission module) 502 to the wireless communication module (second wireless reception module) 302 may be realized by using a two-way wireless communication method with a relatively high rate. In this case, each of the wireless transmission module (first wireless transmission module) 502 and the wireless communication module (second wireless reception module) 302 can be realized by a Bluetooth (trademark) module or a wireless LAN module.

The wireless communication for transmitting the power information from the wireless transmission module (first wireless transmission module) 502 to the wireless communication module (second wireless reception module) 302 may also be realized by using a one-way wireless communication method with a low communication rate.

The conversion process module 303 executes, where necessary, a process of converting the value of power that is received by the wireless communication module (second wireless reception module) 302. For example, in the case where the power value, which is sent from the wireless transmission module (first wireless transmission module) 502, is an instantaneous value, for instance, watt/second, the conversion process module 303 executes a process of converting the power value to a power value (watt/hour) indicative of power that is consumed per hour, an amount of power consumed per day, or an electricity charge per day or month.

Figure 3:
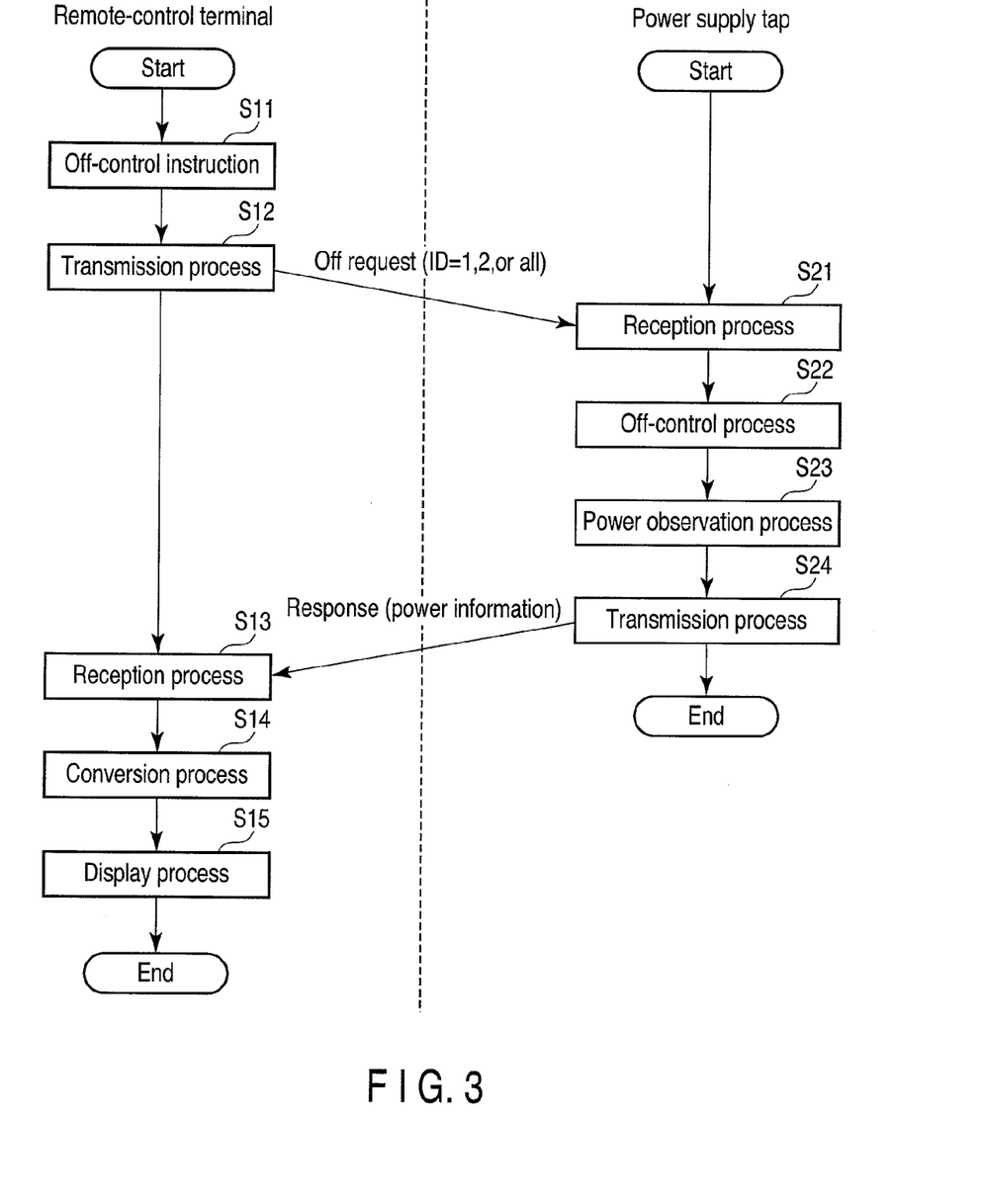
FIG. 3 is an exemplary flow chart illustrating the procedure of a power-off process which is executed by the remote power control system according to the embodiment.

Next, referring to a flow chart of FIG. 3, a description is given of the process of shutting off power supply to the electric apparatus by remote-control from the remote-control terminal 21.

If a power-off instruction is input from the input module 22 by the user's operation of the operation button (operation button 222, 223 or 224) (block S11), the wireless communication module (second wireless transmission module) 301 in the remote-control terminal 21 transmits the control request including the power-off request to the power supply tap 11 by the first wireless signal (block S12). The power-off request includes the ID for designating the power output module that is to be powered off. The control request including the power-off request is received by the wireless communication module (first wireless reception module) 501 in the power supply tap 11 (block S21).

In the power supply tap 11, in response to the reception of the control request including the power-off request by the wireless communication module (first wireless reception module) 501, activation request signals are generated, for example, from the wireless communication module (first wireless reception module) 501 to the switch control module 503, power observation module 504 and wireless communication module (first wireless transmission module) 502. Thereby, the switch control module 503, power observation module 504 and wireless communication module (first wireless transmission module) 502 are activated.

The switch control module 503 turns off the switch corresponding to the power output module which is designated by the ID included in the power-off request, thereby shutting off power supply to the electric apparatus from the power output module that is designated by the ID included in the power-off request (block S22). Thus, for example, in the case where the electric apparatus, which is connected to the power output module designated by the ID, is in the standby state, the standby power consumed by the electric apparatus can be reduced to zero.

In order to obtain an index which is indicative of the power-saving effect by the turn-off control process in block S22, that is, the power-saving effect by the turn-off of the switch, the power observation module 504 observes, for example, the variation in total amount of power before and after the turn-off of the switch, or the total amount of power after the turn-off of the switch (block S23).

The wireless communication module (first wireless transmission module) 502 sends, as a response to the power-off control request, the power information indicative of the value, which is observed by the power observation module 504, to the remote-control terminal 21 by the second wireless signal (block S24).

This power information is received by the wireless communication module (second wireless reception module) 302 in the remote-control terminal 21 (block S13). In the remote-control terminal 21, the power information that is received by the wireless communication module (second wireless reception module) 302 is subjected to a predetermined conversion process by the conversion process module 303, where necessary (block S14). On the basis of the received power information, the information indicative of the power-saving effect by the power-off control process (e.g. the amount of power saved by the power-off control process, the amount of power consumed after the power-off control process, an electricity charge saved by the power-off control process, or an electricity charge after the power-off control process) is displayed on the display screen of the display module 23 (block S15).

As has been described above, simply by inputting the power-off instruction by operating the operation button of the remote-control terminal 21, the user can shut off the power supply to a desired electric apparatus, and can easily confirm the power-saving effect resulting from the input of the power-off instruction, by viewing the display module 23 of the remote-control terminal 21. Therefore, the user's consciousness of energy saving can be enhanced.

Figure 4:
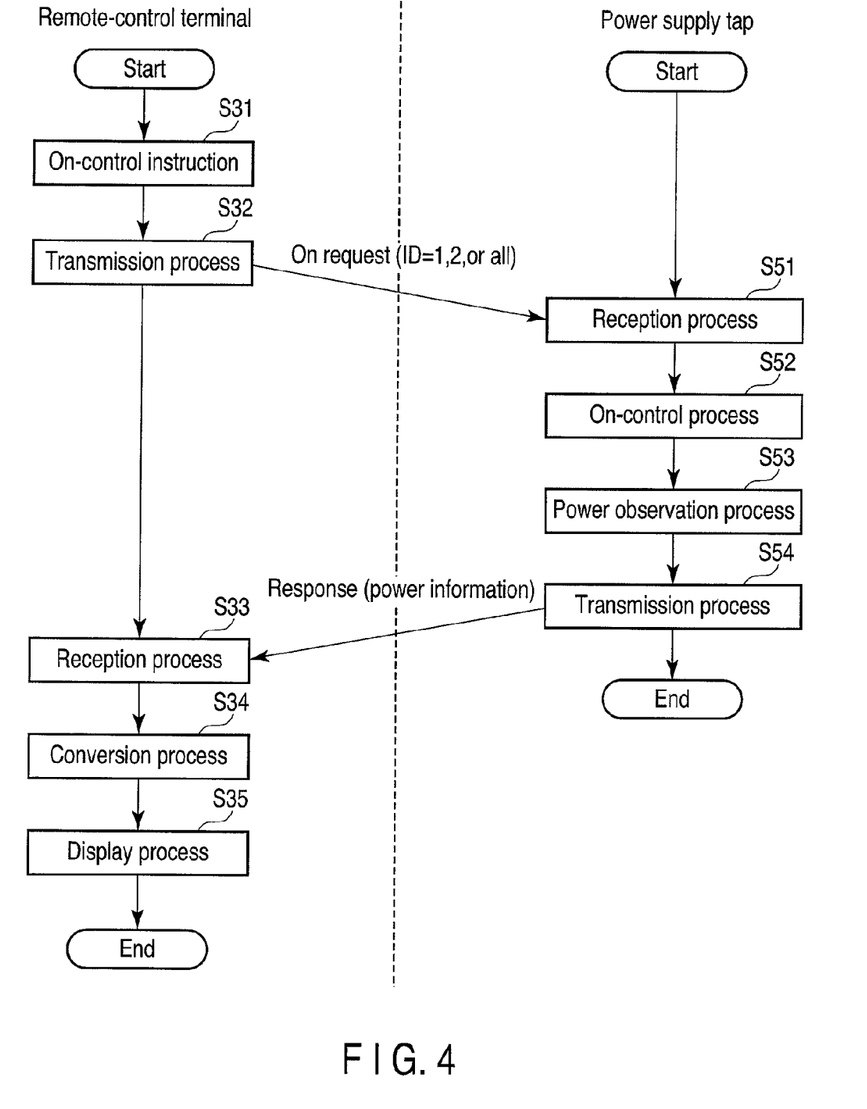
FIG. 4 is an exemplary flow chart illustrating the procedure of a power-on process which is executed by the remote power control system according to the embodiment.

Next, referring to a flow chart of FIG. 4, a description is given of the process of turning on power supply to the electric apparatus by remote-control from the remote-control terminal 21.

If a power-on instruction is input from the input module 22 by the user's operation of the operation button (operation button 222, 223 or 224) (block S31), the wireless communication module (second wireless transmission module) 301 in the remote-control terminal 21 transmits the control request including the power-on request to the power supply tap 11 by the first wireless signal (block S32). The power-on request includes the ID for designating the power output module that is to be powered on. The control request including the power-on request is received by the wireless communication module (first wireless reception module) 501 in the power supply tap 11 (block S51).

In the power supply tap 11, in response to the reception of the control request including the power-on request by the wireless communication module (first wireless reception module) 501, activation request signals are generated, for example, from the wireless communication module (first wireless reception module) 501 to the switch control module 503, power observation module 504 and wireless communication module (first wireless transmission module) 502. Thereby, the switch control module 503, power observation module 504 and wireless communication module (first wireless transmission module) 502 are activated.

The switch control module 503 turns on the switch corresponding to the power output module which is designated by the ID included in the power-on request, thereby resuming power supply to the electric apparatus from the power output module that is designated by the ID included in the power-on request (block S52). Thus, for example, the electric apparatus, which is connected to the power output module designated by the ID, transitions from the power-off state to the standby state, thus being able to receive an activation signal, for instance, from a remote-control module which is associated with to this electric apparatus.

The power observation module 504 observes, for example, the total amount of power after the turn-on of the switch (block S53). The wireless communication module (first wireless transmission module) 502 sends, as a response to the power-on control request, the power information indicative of the value, which is observed by the power observation module 504, to the remote-control terminal 21 by the second wireless signal (block S54).

This power information is received by the wireless communication module (second wireless reception module) 302 in the remote-control terminal 21 (block S33). In the remote-control terminal 21, the power information that is received by the wireless communication module (second wireless reception module) 302 is subjected to a predetermined conversion process by the conversion process module 303, where necessary (block S34). On the basis of the received power information, the amount of power consumed after the power-on control process, or an electricity charge after the power-on control is displayed on the display screen of the display module 23 (block S35).

Figure 5:
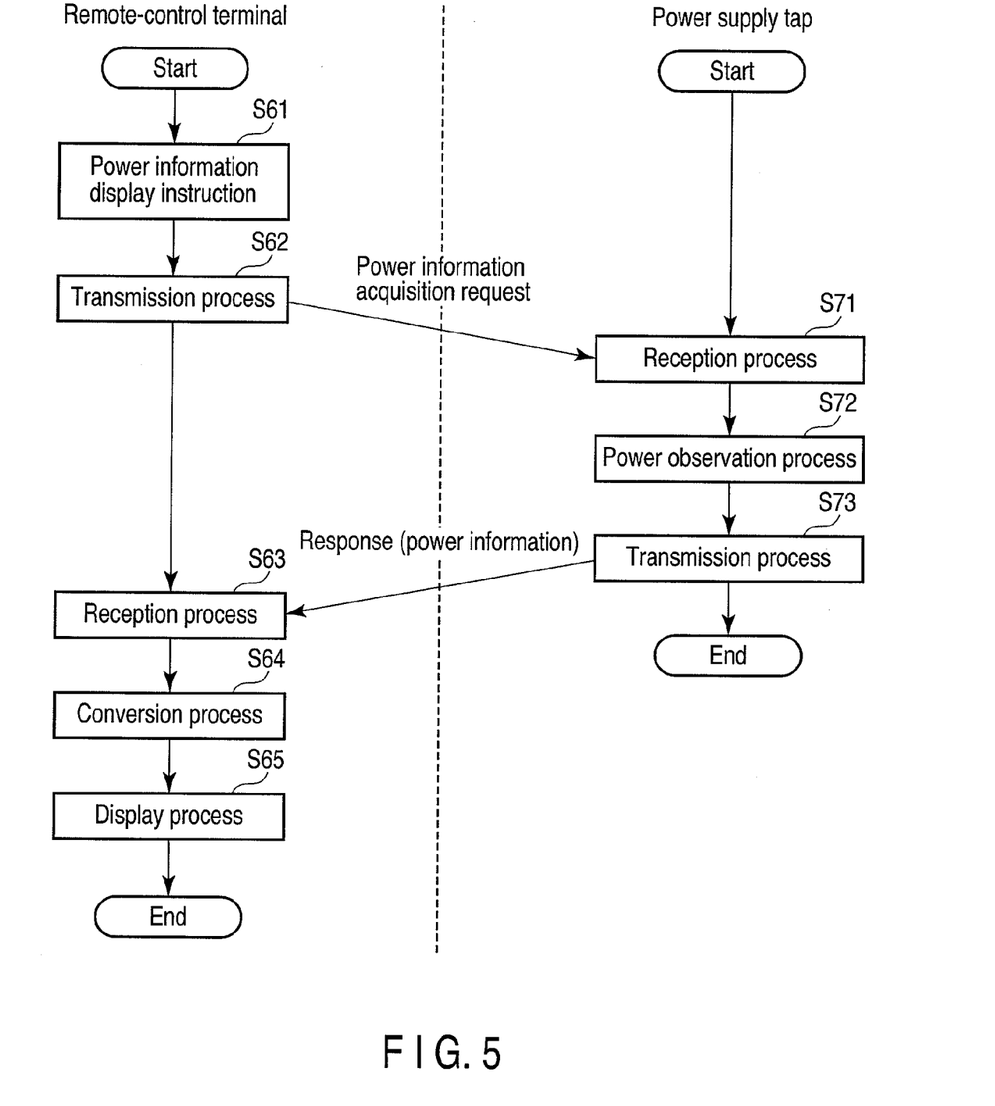
FIG. 5 is an exemplary flow chart illustrating the procedure of a power information display process which is executed by the remote power control system according to the embodiment.

Next, referring to a flow chart of FIG. 5, a description is given of the process of displaying, on the remote-control terminal 21, the amount of power that is currently consumed via the power supply tap 11, by remote-control from the remote-control terminal 21.

If a power information display instruction is input from the input module 22 by the user's operation of the operation button (operation button 221) (block S61), the wireless communication module (second wireless transmission module) 301 in the remote-control terminal 21 transmits the control request including a power information acquisition request to the power supply tap 11 by the first wireless signal (block S62). The control request including the power information acquisition request is received by the wireless communication module (first wireless reception module) 501 in the power supply tap 11 (block S71).

In the power supply tap 11, in response to the reception of the control request including the power information acquisition request by the wireless communication module (first wireless reception module) 501, activation request signals are generated, for example, from the wireless communication module (first wireless reception module) 501 to the power observation module 504 and wireless communication module (first wireless transmission module) 502. Thereby, the power observation module 504 and wireless communication module (first wireless transmission module) 502 are activated.

The power observation module 504 measures the current flowing from the power input module 401 to the power output module 12, 13 and the current flowing from the power supply module 404 to the communication control module 500, thereby observing the total amount of power consumed by the power supply tap 11, which includes the power supplied to at least one electric apparatus via the power supply tap 11 and the power consumed by the communication control module 500 (block S72).

The wireless communication module (first wireless transmission module) 502 sends, as a response to the power information acquisition request, the power information indicative of the value, which is observed by the power observation module 504, to the remote-control terminal 21 by the second wireless signal (block S73).

This power information is received by the wireless communication module (second wireless reception module) 302 in the remote-control terminal 21 (block S63). In the remote-control terminal 21, the power information that is received by the wireless communication module (second wireless reception module) 302 is subjected to a predetermined conversion process by the conversion process module 303, where necessary (block S64). On the basis of the received power information, the information indicative of the power consumed via the power supply tap 11 (e.g. the amount of power that is currently consumed via the power supply tap 11, or an electricity charge corresponding to the amount of power that is currently consumed via the power supply tap 11) is displayed on the display screen of the display module 23 (block S65).

As has been described above, simply by inputting the power information display instruction by operating the operation button of the remote-control terminal 21, the user can easily confirm the information relating to the amount of power, which is currently consumed via the power supply tap 11, by viewing the display module 23 of the remote-control terminal 21. Therefore, the user can understand, for example, how much power is consumed by the electric apparatus and the communication control module 500 in the power supply tap 11, and can, where necessary, perform operations for setting the electric apparatus in the standby state by the remote-control module that is associated with the electric apparatus, shutting off the power supply to the electric apparatus in the standby state by inputting the power-off instruction by operating the input module 22, or pulling out the power supply tap 11 itself from the plug socket.

As has been described above, according to the present embodiment, the power observation module 504 in the power supply tap 11 operates only when the control request from the remote-control terminal 21 is received by the wireless communication module (first wireless reception module) 501. Thereby, the power consumption by the communication control module 500 can be reduced, compared to the case in which the power observation module 504 is always in operation. In addition, in the present embodiment, the power consumed at the standby time for waiting for the control request from the remote-control terminal 21 is, basically, only the standby power of the wireless communication module (first wireless reception module) 501 in the communication control module 500. Thus, the power (standby power of the communication control module 500), which is consumed by the communication control module 500 at the standby time for waiting for the control request from the remote-control terminal 21, is very small.

Moreover, in the present embodiment, the user is informed of the amount of power consumed via the power supply tap 11, with consideration given to the amount power consumed by the communication control module 500. Therefore, the correct amount of power which is consumed via the power supply tap 11, or a correct electricity charge corresponding to this amount of power, can be presented to the user. Furthermore, the power supply to the electric apparatus can be shut off by remote-control from the remote-control terminal 21, thereby reducing to zero the power (standby power) which is consumed by the electric apparatus in the standby state. Therefore, according to the present embodiment, useless power consumption can be reduced, and the operation relating to power saving by the user can sufficiently be supported.

The present embodiment is configured to transmit, as a response to the power-off request, the power information from the power supply tap 11 to the remote-control terminal 21. However, it is not always necessary to return the power information from the power supply tap 11 to the remote-control terminal 21. The reason for this is that if the user executes the operation for inputting the power information display instruction after executing the operation for inputting the power-off instruction, the user can confirm the power-saving effect by the power-off. Thus, in the case where the power information is not returned as a response to the power-off request, the power observation module 504 may be configured to be activated only when the received control request includes the power information acquisition information.

In the present embodiment, the case in which the power supply tap 11 is provided with two power output modules is exemplified. Alternatively, the number of power output module s, which are provided in the power supply tap 11, may be one.

In the present embodiment, the solar cell module 24 is mounted in the remote-control terminal 22. Alternatively, a charging system using a photocapacitor may be utilized.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A remote power control system comprising a power supply tap and a remote-control terminal configured to remotely control the power supply tap by a wireless signal, the power supply tap comprising:
    a power input module configured to receive power;
    a power output module configured to output the power to an electric apparatus;
    a switch disposed between the power input module and the power output module; and
    a communication control module configured to wirelessly communicate with the remote-control terminal, the communication control module comprising a first wireless reception module configured to receive a control request transmitted from the remote-control terminal by a first wireless signal, a switch control module configured to turn off the switch in order to shut off power supply to the electric apparatus from the power output module when the control request received by the first wireless reception module comprises a power-off request, a power observation module configured to observe a total amount of power consumed after the switch is turned off when the received control request comprises a power-off request, the total amount of power comprising power supplied to the electric apparatus from the power output module and power consumed by the communication control module, and a first wireless transmission module configured to transmit the total amount of power observed by the power observation module to the remote-control terminal by a second wireless signal, and
    the remote-control terminal comprising:
    an input module;
    a second wireless transmission module configured to transmit the control request comprising the power-off request, to the power supply tap by the first wireless signal in response to an operation of the input module;
    a second wireless reception module configured to receive the observed total amount of power transmitted from the control terminal power supply tap by the second wireless signal; and
    a display configured to display information relating to the power consumed via the power supply tap based on the total amount of power received by the second wireless reception module.

2. The remote power control system of claim 1, wherein the power observation module is configured to observe the total amounts of power, and the first wireless transmission module is configured to transmit the total amounts of power observed by the power observation module to the remote-control terminal by the second wireless signal, if the received control request comprises a power request acquisition request.

3. The remote power control system of claim 1, wherein the first wireless transmission module is activated after the control request is received by the first wireless reception module.

4. The remote power control system of claim 3, wherein a wireless communication between the second wireless transmission module and the first wireless reception module by using the first wireless signal is slower than a wireless communication between the first wireless transmission module and the second wireless reception module by using the second wireless signal.

5. The remote power control system of claim 1, wherein the remote-control terminal comprises a solar cell module configured to supply power to the input module, the second wireless transmission module, the second wireless reception module and the display.

6. The remote power control system of claim 1, wherein the power observation unit is activated when the first wireless reception module receives a control request.

7. A power supply tap configured to wirelessly communicate with a remote-control terminal, comprising:
    a power input module configured to receive power;
    a power output module configured to output the power to an electric apparatus;
    a switch disposed between the power input module and the power output module; and
    a communication control module configured to execute wireless communication with the remote-control terminal, the communication control module comprising a wireless reception module configured to receive a control request transmitted from the remote-control terminal by a first wireless signal, a switch control module configured to turn off the switch in order to shut off power supply to the electric apparatus from the power output module when the control request received by the wireless reception module comprises a power-off request, a power observation module configured to observe a total amount of power consumed after the switch is turned off when the received control request comprises a power-off request, the total amount of power comprising power supplied to the electric apparatus from the power output module and power consumed by the communication control module, and a wireless transmission module configured to transmit the total amount of power observed by the power observation module to the remote-control terminal by a second wireless signal.

8. The power supply tap of claim 7, wherein the power observation module is configured to observe the total amounts of power, and the wireless transmission module is configured to transmit the total amounts of power observed by the power observation module to the remote-control terminal by the second wireless signal, when the received control request comprises a power request acquisition request.

9. The power supply tap of claim 7, wherein the wireless transmission module is activated after the control request is received by the wireless reception module.

10. The power supply tap of claim 9, wherein a wireless communication between the second wireless transmission module and the first wireless reception module by using the first wireless signal is slower than a wireless communication between the first wireless transmission module and the second wireless reception module by using the second wireless signal.

11. A remote power control system comprising a power supply tap and a remote-control terminal configured to remotely control the power supply tap by a wireless signal, the power supply tap comprising:
    a power input module configured to receive power;
    a power output module configured to output the power to an electric apparatus;
    a switch disposed between the power input module and the power output module; and
    a communication control module configured to wirelessly communicate with the remote-control terminal, the communication control module comprising a first wireless reception module configured to receive a control request transmitted from the remote-control terminal by a first wireless signal, a switch control module configured to turn off the switch in order to shut off power supply to the electric apparatus from the power output module when the control request received by the first wireless reception module comprises a power-off request, a power observation module configured to observe a variation of the total amount of power before and after turn-off of the switch when the received control request comprises a power-off request, the total amount of power comprising power supplied to the electric apparatus from the power output module and power consumed by the communication control module, and a first wireless transmission module configured to transmit the variation observed by the power observation module to the remote-control terminal by a second wireless signal, and the remote-control terminal comprising:
    an input module;
    a second wireless transmission module configured to transmit the control request comprising the power-off request, to the power supply tap by the first wireless signal in response to an operation of the input module;
    a second wireless reception module configured to receive the observed total amount of power transmitted from the power supply tap by the second wireless signal; and
    a display configured to display information relating to the power consumed via the power supply tap based on the total amount of power received by the second wireless reception module.

12. A power supply tap configured to wirelessly communicate with a remote-control terminal, comprising:
    a power input module configured to receive power;
    a power output module configured to output the power to an electric apparatus;
    a switch disposed between the power input module and the power output module; and
    a communication control module configured to execute wireless communication with the remote-control terminal, the communication control module comprising a wireless reception module configured to receive a control request transmitted from the remote-control terminal by a first wireless signal, a switch control module configured to turn off the switch in order to shut off power supply to the electric apparatus from the power output module when the control request received by the wireless reception module comprises a power-off request, a power observation module configured to observe a variation of the total amount of power before and after turn-off of the switch when the received control request comprises a power-off request, the total amount of power comprising power supplied to the electric apparatus from the power output module and power consumed by the communication control module, and a wireless transmission module configured to transmit the variation observed by the power observation module to the remote-control terminal by a second wireless signal.

* * * * *